United States Patent [19]
Lagoni

[11] Patent Number: 4,980,756
[45] Date of Patent: Dec. 25, 1990

[54] CONTROL SIGNAL GENERATOR FOR A TELEVISION SYSTEM

[75] Inventor: William A. Lagoni, Indianapolis, Ind.

[73] Assignee: RCA Licensing Corporation, Princeton, N.J.

[21] Appl. No.: 398,849

[22] Filed: Aug. 25, 1989

[51] Int. Cl.⁵ .......................... H04N 5/57; H04N 9/64
[52] U.S. Cl. ....................................... 358/39; 358/168; 358/169; 358/174
[58] Field of Search ................. 358/21 R, 27, 39, 168, 358/174, 169

[56] References Cited

U.S. PATENT DOCUMENTS

| | | | |
|---|---|---|---|
| 4,110,787 | 8/1978 | Parker | 358/34 |
| 4,167,750 | 9/1979 | Tomimoto et al. | 358/27 |
| 4,553,157 | 11/1985 | Hurst, Jr. et al. | 358/27 |
| 4,599,643 | 7/1986 | Hartlan | 358/74 |

OTHER PUBLICATIONS

VALVO Entwicklungsmitteilungen 77, 1980 of a "Complete Pal Decoder with integrated circuit TDA3560".

*Primary Examiner*—John W. Shepperd
*Attorney, Agent, or Firm*—Joseph S. Tripoli; Peter M. Emanuel; Frederick A. Wein

[57] ABSTRACT

In a color television system, the color signals produced by a luma-chroma IC are summed to produce a signal representative of processed luminance information not otherwise readily available. Pulses of the summed signal corresponding to retrace blanking pulses contained in the color signals, are stripped away in order to reduce errors when attributes of the summed signal are determined, e.g., by an average detector. The detector provides a control signal for modification of a luminance signal, such as by "white stretch".

16 Claims, 2 Drawing Sheets

CONTROL SIGNAL GENERATOR FOR A TELEVISION SYSTEM

RELATED APPLICATIONS

The present application is related to concurrently filed U.S. patent application Ser. No. 398,845 filed Aug. 25, 1989, entitled "A DYNAMIC VIDEO SYSTEM INCLUDING AUTOMATIC CONTRAST AND 'WHITE-STRETCH' PROCESSING SECTIONS", and concurrently filed U.S. patent application Ser. No. 398,847 filed Aug. 25, 1989, entitled "AMPLIFIER ARRANGEMENT FOR PRODUCING A CONTROLLABLE NON-LINEAR TRANSFER CHARACTERISTIC USEFUL FOR IMPROVING THE CONTRAST OF AN IMAGE", all three applications having the same inventor and assignee.

FIELD OF THE INVENTION

The present invention relates to a control signal generator for a television system.

BACKGROUND OF THE INVENTION

In many television systems a particular characteristic of a video signal is detected in order to generate a control signal. For example, concurrently filed U.S. patent application Ser, No. 398,845 filed Aug. 25, 1989, entitled "A DYNAMIC VIDEO SYSTEM INCLUDING AUTOMATIC CONTRAST AND 'WHITE-STRETCH' PROCESSING SECTIONS", referred to above, discloses a system for detecting the average value of a signal representing luminance information in order to generate a control signal for controlling the non-linear gain characteristic of a "white-stretch" processing section to enhance the contrast of a reproduced image. In other video control systems, it may be necessary to detect other characteristics of a luminance-representative signal, e.g., such as its peak-to-peak value. At any rate, it is desirable to utilize a luminance-representative signal which reflects contrast and/or brightness adjustments affecting the image content. Unfortunately, such a luminance-representative signal may not be readily available for detection when an integrated circuit incorporating luminance and chrominance signal processing sections is utilized. The present invention is directed to that dilemma.

SUMMARY OF THE INVENTION

In accordance with a feature of the invention, for use in television systems, of the type referred to above, in which the luminance and chrominance processing sections are incorporated in an integrated circuit and processed luminance information is therefore not readily available, a signal combining circuit is provided for combining color signals produced at output terminals of the integrated circuit to produce a "summed" signal at least approximating the unavailable processed luminance information. In accordance with another feature of the invention, it is recognized that the "summed" signal will contain pulses corresponding to retrace blanking pulses inserted in the retrace intervals of the color signals and that such pulses will disturb the average and peak-to-peak values of the summed signal. Accordingly, an amplifier associated with the combining circuit is biased to remove the pulses of the summed signal while retaining substantially the entirety of the summed signal between a nominal black level and white-going excursions. In this way, a reliable control signal may be derived from the resultant signal by, e.g., an average or peak-to-peak detector.

BRIEF DESCRIPTION OF THE DRAWINGS

For a detailed understanding of the present invention, reference should be made to the accompanying drawings in which.

In the FIGURES, the same reference numbers have been assigned to the same or similar elements.

DETAILED DESCRIPTION OF THE PREFERRED EMBODIMENT

In the following description, it is assumed that positive-going portions of the luminance signal correspond to white-going portions of a reproduced image.

Figure 1:
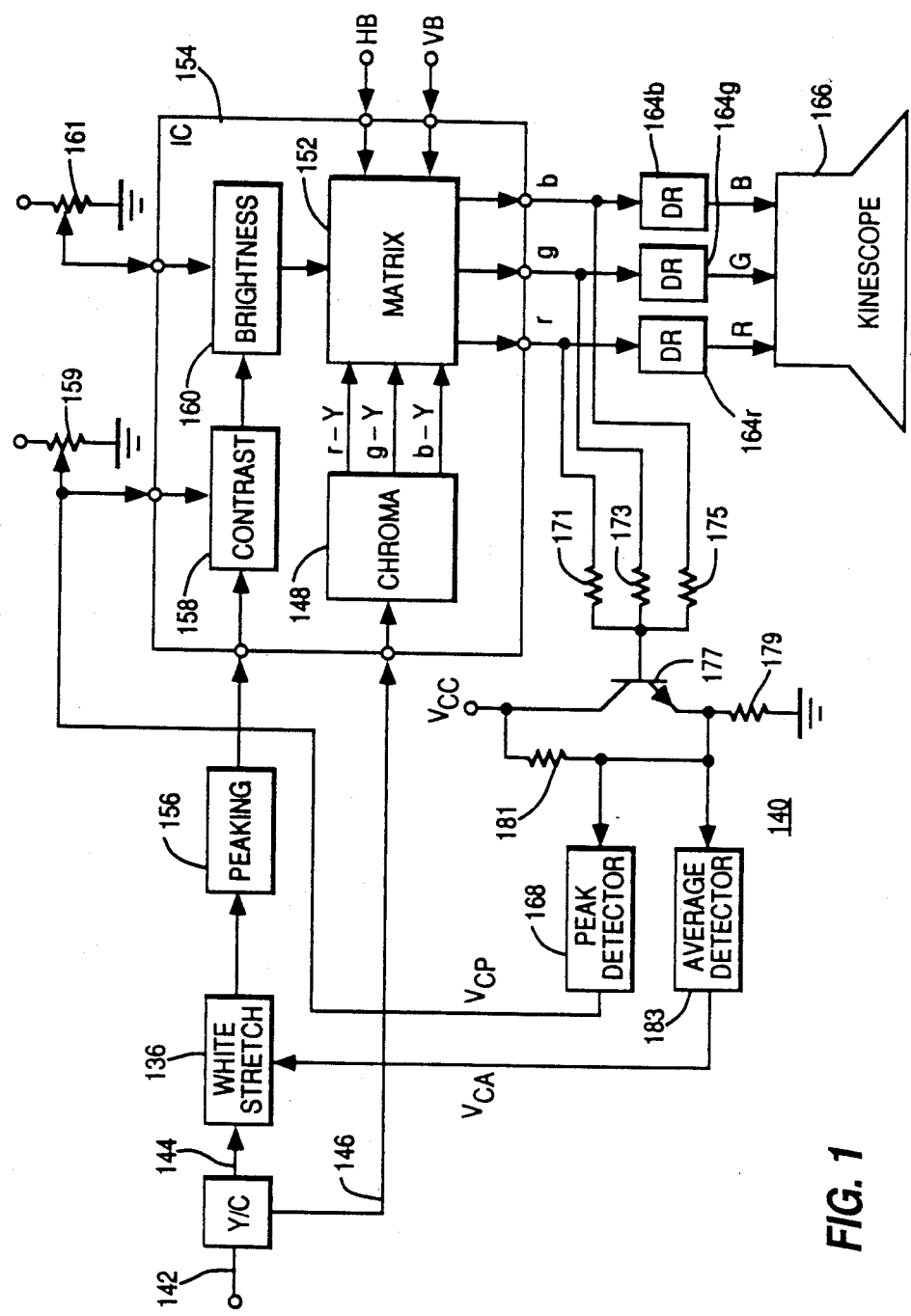
FIG. 1 shows, partially in block diagram form and partially in schematic form, a television system including a control signal generator constructed in accordance with the invention.

In the television system shown in FIG. 1, a composite video provided at an input 142 is separated into two components: a luminance signal provided at an output 144, and a chrominance signal provided at an output 146.

The chrominance signal is processed in a well known manner in processor 148 for producing red, green and blue color difference signals r-Y, b-Y and g-Y. The color difference signals are coupled to a matrix 152. Chrominance processing unit 148 and matrix 152 may be included in an integrated circuit (IC) 154.

The luminance signal is coupled to a white stretch processing unit 136 which also receives the control signal $V_{CA}$ generated by a control signal generator 140 with which the present application is particularly concerned and which will be described in detail below. The output signal of white-stretch processing unit 136 is coupled to a peaking circuit 156 for improving the sharpness of the image. The output signal of peaking circuit 156 is coupled to integrated circuit 154.

For luminance signal processing, integrated circuit 154 includes contrast control unit 158 and a brightness control unit 160. User adjustment elements for contrast and brightness are symbolically represented by potentiometers 159 and 161, respectively, although in modern television systems, they usually include microprocessor controlled digital-to-analog converters. The processed luminanace signal is coupled to matrix 152 where it is combined with the color difference signals to produce low level red(r), green(g) and blue(b) color signals. Horizontal and vertical retrace blanking pulses, HB and VB, respectively, generated in a deflection processing section (not shown), are inserted, by matrix 152 in the r,g,b color signals in order to prevent the display of horizontal and vertical retrace lines.

The low level r, g, b color signals are amplified by drive amplifiers 164r, 164b, and 164g, to produce R, G, B drive signals suitable for driving respective cathodes of a kinescope 166.

In order to prevent spot blooming, as well as display driver and phosphor saturation, due to excessive white-going signal peaks, corresponding, e.g., to characters, a peak detector 168 detects the white-going peaks of a luminance-representative signal, generated within control signal generator 140 as will be explained below, and, in response, generates a control signal for contrast control unit 158. Whenever white-going peaks exceeding a threshold corresponding to spot blooming are detected, the contrast is automatically reduced.

Unfortunately, the automatic contrast control apparatus affects all amplitudes uniformly since contrast control unit 158 has a linear gain transfer function. As a result, mid-range as well as high amplitudes tend to be reduced, resulting in a reduction of the subjective brightness of the image. White-stretch processing unit 136 counteracts this action in the following way.

Figure 2A:
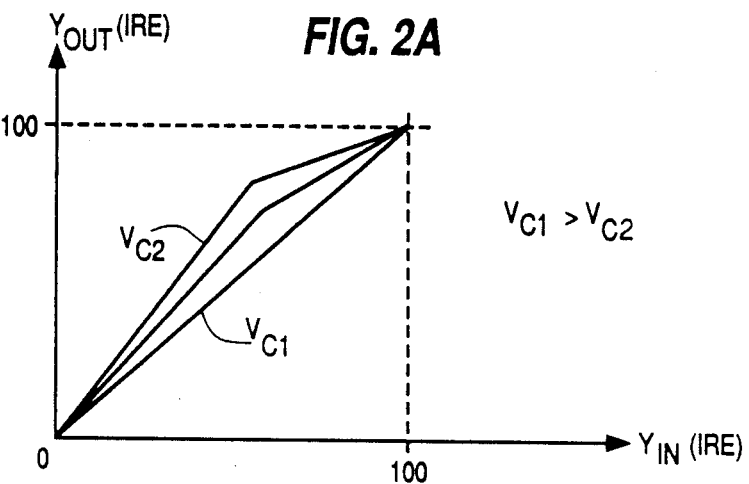
FIGS. 2A and 2B respectively show a graphical representation of a white-stretch gain characteristic and a block diagram of apparatus having a white-stretch transfer function.

The gain characteristic of white stretch processing unit 136 is graphically represented in FIG. 2A. The gain characteristic includes a family of non-linear transfer functions having an increased gain (slope) for mid-range and lower level luminance amplitude levels compared with high luminance amplitude levels. The degree of non-linearity increases as an inverse function of the magnitude of a control signal $V_C$. For the highest magnitude ($V_{C1}$) of control signal $V_C$, the gain characteristic collapses to a linear transfer function.

For lower magnitudes (e.g., $V_{C2} < V_{C1}$), the transfer functions become more non-linear. In FIG. 1, the white-stretch control voltage is identified as $V_{CA}$ because it represents an average signal value, as will be described below.

Figure 2B:
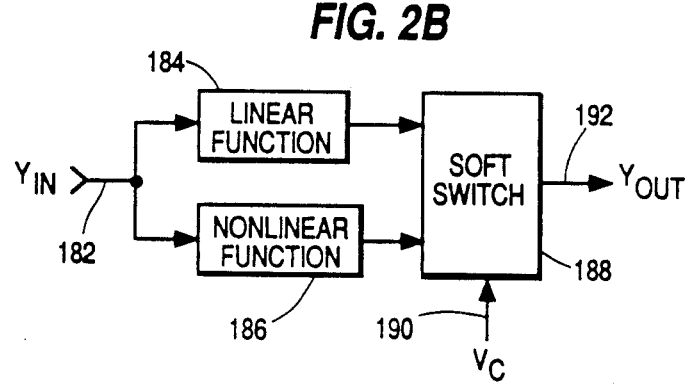

An effective way of providing the transfer function of FIG. 2A is shown in FIG. 2B. An input voltage at an input 182 is coupled in parallel to the input of a linear amplifier 184 and to the input of a nonlinear amplifier 186. The output signals of amplifiers 184 and 186 are coupled to a "soft-switch" 188 which combines the linear and non-linear output signals in accordance with control voltage V to develop a final output signal at 192. The gain characteristic between input 182 and output 192 is that shown in FIG. 2A.

The implementation of the apparatus shown in block diagram form in FIG. 2B is shown and described in detail in the concurrently filed application entitled "AMPLIFIER ARRANGEMENT FOR PRODUCING A CONTROLLABLE NON-LINEAR TRANSFER CHARACTERISTIC USEFUL FOR IMPROVING THE CONTRAST OF AN IMAGE", referred to above.

Returning now to FIG. 1, the control signal (voltage), $V_{CA}$, for white stretch processing unit 136 is derived in response to the average value of the luminance-representative signal (to be discussed below). When the average image brightness is low, control signal $V_{CA}$ causes the degree of non-linearity of white stretch processing unit 136 to be increased (see FIG. 2A for $V_{C2}$) As a result, mid-range amplitudes of the luminance signal are increased relative to high amplitude levels. Since white-going peaks corresponding to small image areas do not significantly affect the average level, an automatic contrast reduction in response to excessive white-going peaks, tending to further reduce mid-range amplitudes, will be compensated for by the white stretch gain increase applied to mid-range amplitudes. In this way, spot blooming, as well as display driver and phosphor saturation, are minimized while providing subjectively sharp, bright images.

As earlier noted, for automatic contrast and white stretch control it is desirable to detect the peak and average, respectively, of a signal representing the luminance component of the reproduced image after image characteristics, such as contrast and brightness, have been adjusted so that the respective control signals will properly reflect the content of the reproduced image. The TA7730 luminance processing IC commercially available from Toshiba provides at an output terminal a luminance-representative signal derived by combining r,g,b color signals which have been subjected to contrast and brightness control. Unfortunately, a luminance or luminance representative signal reflecting contrast and brightness control processing is not provided by other ICs, e.g., such as the TDA4580 available from Valvo, as is indicated with respect to IC 154 in FIG. 1.

Control signal generator 140 is directed to this problem by combining the r,g,b color signals produced at respective output terminals of IC 154 to produce a signal at least approximately representing processed luminance information. However, the resulting "summed luminance" signal contains pulses corresponding to the high level (e.g., in the range of $-100$ to $-160$ IRE) retrace blanking pulses contained in the r,g,b signals which are combined, unlike the summed luminance signal produced by the TA7730 IC, in which r,g,b signals are combined before retrace blanking pulses are added. The pulses contained in a summed luminance signal extend significantly below the black level and will therefore substantially affect the average value (as well as the peak-to-peak value). Accordingly, a control signal derived by detecting the average value of the summed signal would not accurately represent the brightness of the reproduced image. Control signal generator 140 also includes provisions directed to this problem.

Specifically, with respect to control signal generator 140, the r,g,b color signals produced at respective output terminals of IC 154 are summed by means of a resistive combiner comprising resistors 171, 173, 175. The resultant summed signal, produced at the common junction of resistor 171, 173 and 175, is coupled to the base of an emitter-follower amplifier 177. An output signal is developed across a load resistor 179 at the low impedance emitter output of emitter-follower 177.

A resistor 181 coupled between a supply voltage source ($V_{CC}$) and the emitter of emitter follower 177 raises the conduction threshold of emitter-follower 177 so that substantially the entirety of the white-going summed signal above the black level is provided at the emitter output, but the pulses, corresponding to the retrace blanking pulses of the r,g,b, color signals, are removed in the exemplary embodiment by clipping or stripping. Thus, due to the increased bias applied to the emitter, the detected average value and the resultant white-stretch control signal, $V_{CA}$, are relatively reliable representations of the average luminance component of the reproduced image.

While resistors 171, 173 and 175 can be proportioned according to the well known luminance matrix equation to accurately produce a luminance signal, a ratio of 1:1:1 has been found to be very satisfactory in practice for providing a processed luminance-representative component suitable for white-stretch processing control. Also in this regard, it is noted that because a black image corresponds to a complete lack of color information, it is possible to set the conduction threshold of transistor 177 to correspond to the nominal black level independently of the resistor ratio. Brightness adjustments have not been found to significantly affect the accuracy of setting the black threshold of transistor 177 in this manner.

While the discussion so far has been with reference to an arrangement in which all three color signals are summed to produce a luminance representative signal, it is also possible to use two color signals or even one color signal, as long as the blanking-related pulses are removed. This is because, on a statistical basis, the average of any color signal is close enough to the average of the luminance component so as to be adequate in a particular white-stretch processing control application. If one color signal is utilized, the green color signal is preferred because it most closely relates to the luminance information contained in an image.

The average value of the summed output signal is developed by an average detector 183, which may simply comprise an R-C low pass filter. The value of the white peaks of the summed output signal are detected by peak detector 168. A suitable peak detector, which is capable of responding to very sharp peaks, is disclosed in U.S. patent application Ser. No. 380,697 entitled "Peak Detector With Feedback", filed on July 14, 1989 in the name of G. A. Whitledge and assigned to the same assignee as that of the present application.

While there has been illustrated and described what is at present considered to be a preferred embodiment of the present invention, it will be appreciated that changes and modifications may occur to those skilled in the art. For example, while the invention has been described with reference to an IC in which contrast and brightness are controlled by controlling the amplitude and DC content of the luminance signal, contrast and brightness may be controlled by individually controlling the amplitude and DC content of the color signals. This is the case in the TA7730 and TDA4580 ICs referred to above. In addition, while an emitter-follower amplifier is used in the exemplary embodiment, a different type of amplifier or any other type of clipping arrangement for which a conduction threshold can be set may be employed to remove the retrace-blanking related pulses. It is intended that the following claims cover all of such and other modifications which fall within the scope of the present invention.

I claim:

1. In a television system, apparatus for producing a control voltage for a signal processor comprising:
   source means for providing a plurality of color signals having a trace portion and blanking pulses;
   signal combining means for summing said color signals to produce an intermediate signal having trace portions and blanking-related pulses;
   clipping means operatively coupled to the signal combining means for removing the blanking-related pulses from intermediate signal while retaining substantially the entirety of said trace portions of said intermediate signal to produce an output signal; and
   detecting means for providing a control signal in response to said output signal.

2. The apparatus defined in claim 1, wherein:
   said source means comprises an integrated circuit for processing luminance and chrominance components of a television signal to produce said color signals, said integrated circuit including controllable processing means for altering the characteristics of said color signals.

3. The apparatus defined in claim 2, wherein:
   said control signal is coupled to additional processing means for controlling the characteristics of said color signals.

4. The apparatus defined in claim 3, wherein:
   said processing means comprises at least one of contrast control means and brightness control means.

5. The apparatus defined in claim 4, wherein:
   said additional control means includes a controllable non-linear amplifier arrangement.

6. The apparatus defined in claim 5, wherein:
   said detecting means comprises an average detector.

7. The apparatus defined in claim 1, wherein:
   said detecting means comprises an average detector.

8. The apparatus defined in claim 1, wherein:
   said combining means comprises a resistive network.

9. The apparatus defined in claim 1, wherein:
   said clipping means comprises an emitter-follower and a source of bias voltage coupled to said emitter-follower.

10. A television apparatus for determining attributes of the trace portion of a video signal comprising:
    means for summing a plurality of input signals, each having a trace portion and blanking pulse portions for producing a summed signal having trace portions and blanking-related pulse portions;
    means for stripping the blanking pulse portions from the summed signal and retaining substantially the entirety of the trace portion of said summed signal to produce a resultant signal; and
    means for detecting a signal characteristic of said trace portions of the resultant signal.

11. The apparatus defined in claim 10, wherein:
    said input signals are color signals.

12. The apparatus defined in claim 11, wherein:
    said summed signal at least approximately corresponds to luminance information.

13. The apparatus defined in claim 11, wherein:
    said means for detecting detects the average level of said resultant signal.

14. The apparatus defined in claim 13, wherein:
    said control signal is coupled to a controllable non-linear amplifier arrangement to control its gain characteristics.

15. In a television system, apparatus comprising:
    means for providing at least one video signal including video information contained in trace intervals and retrace blanking pulses contained in retrace intervals;
    means for stripping said retrace pulses from said video signal so as to produce a resultant signal containing substantially the entirety of the video information contained in said trace interval; and
    means detecting a characteristic of said resultant video signal to produce a control signal.

16. The apparatus defined in claim 15, wherein:
    said gain characteristics is a white-stretch gain characteristic.

* * * * *